US009215344B2

(12) United States Patent
Kashima et al.

(10) Patent No.: US 9,215,344 B2
(45) Date of Patent: Dec. 15, 2015

(54) IMAGE FORMING APPARATUS, IMAGE PROCESSING APPARATUS, IMAGE FORMING METHOD, IMAGE PROCESSING METHOD, AND NON-TRANSITORY COMPUTER READABLE MEDIUM

(71) Applicant: FUJI XEROX CO., LTD., Tokyo (JP)

(72) Inventors: Yozo Kashima, Kanagawa (JP); Naoyuki Enomoto, Kanagawa (JP); Tomohisa Ishikawa, Kanagawa (JP); Tetsuharu Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/575,292

(22) Filed: Dec. 18, 2014

(65) Prior Publication Data
US 2015/0312441 A1    Oct. 29, 2015

(30) Foreign Application Priority Data

Apr. 23, 2014    (JP) .................................. 2014-088907

(51) Int. Cl.
*G06F 15/00* (2006.01)
*G06K 1/00* (2006.01)
*G06K 15/02* (2006.01)
*H04N 1/38* (2006.01)
*H04N 1/40* (2006.01)

(52) U.S. Cl.
CPC ............. *H04N 1/38* (2013.01); *H04N 1/40093* (2013.01); *H04N 2201/0082* (2013.01)

(58) Field of Classification Search
USPC ................................................ 358/1.1–1.18
See application file for complete search history.

(56) References Cited

U.S. PATENT DOCUMENTS

| 8,779,359 B2* | 7/2014 | Ogiso et al. .................... 250/310 |
| 2004/0212819 A1* | 10/2004 | Nishimura et al. .......... 358/1.13 |
| 2012/0236368 A1 | 9/2012 | Uchida et al. |

FOREIGN PATENT DOCUMENTS

| JP | A-7-234885 | 9/1995 |
| JP | B2-2996933 | 1/2000 |
| JP | 2012-190418 A | 10/2012 |
| JP | 2012-199698 A | 10/2012 |
| JP | 2013-029982 A | 2/2013 |

OTHER PUBLICATIONS

Translation of Apr. 27, 2015 Office Action issued in Japanese Patent Application No. 2014-088907.
Translation of Jul. 17, 2015 Office Action issued in Japanese Patent Application No. 2014-088907.

* cited by examiner

*Primary Examiner* — Douglas Tran
(74) *Attorney, Agent, or Firm* — Oliff PLC

(57) ABSTRACT

An image processing apparatus includes a receiving unit, a detecting unit, and a generating unit. The receiving unit receives two pieces of image data to be compared with each other. The detecting unit detects the difference between the two pieces of image data received by the receiving unit. If a drawing element in the image data where the difference is detected by the detecting unit is dense with modified parts to such an extent that it is estimated to be difficult to identify the content of modification in the display of the difference, the generating unit generates difference image data indicating the difference between the two pieces of image data for comparison by adding an auxiliary image to highlight the content of the detected difference.

15 Claims, 14 Drawing Sheets

IMAGE FORMING APPARATUS, IMAGE PROCESSING APPARATUS, IMAGE FORMING METHOD, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-088907 filed Apr. 23, 2014.

BACKGROUND

The present invention relates to an image forming apparatus, an image processing apparatus, an image forming method, an image processing method, and a non-transitory computer readable medium.

SUMMARY

According to an aspect of the invention, there is provided an image processing apparatus including a receiving unit, a detecting unit, and a generating unit. The receiving unit receives two pieces of image data to be compared with each other. The detecting unit detects the difference between the two pieces of image data received by the receiving unit. If a drawing element in the image data where the difference is detected by the detecting unit is dense with modified parts to such an extent that it is estimated to be difficult to identify the content of modification in the display of the difference, the generating unit generates difference image data indicating the difference between the two pieces of image data for comparison by adding an auxiliary image to highlight the content of the detected difference.

BRIEF DESCRIPTION OF THE DRAWINGS

Exemplary embodiments of the present invention will be described in detail based on the following figures, wherein.

DETAILED DESCRIPTION

Exemplary embodiments of the present invention will herein be described in detail with reference to the attached drawings.

First Exemplary Embodiment

Figure 1:
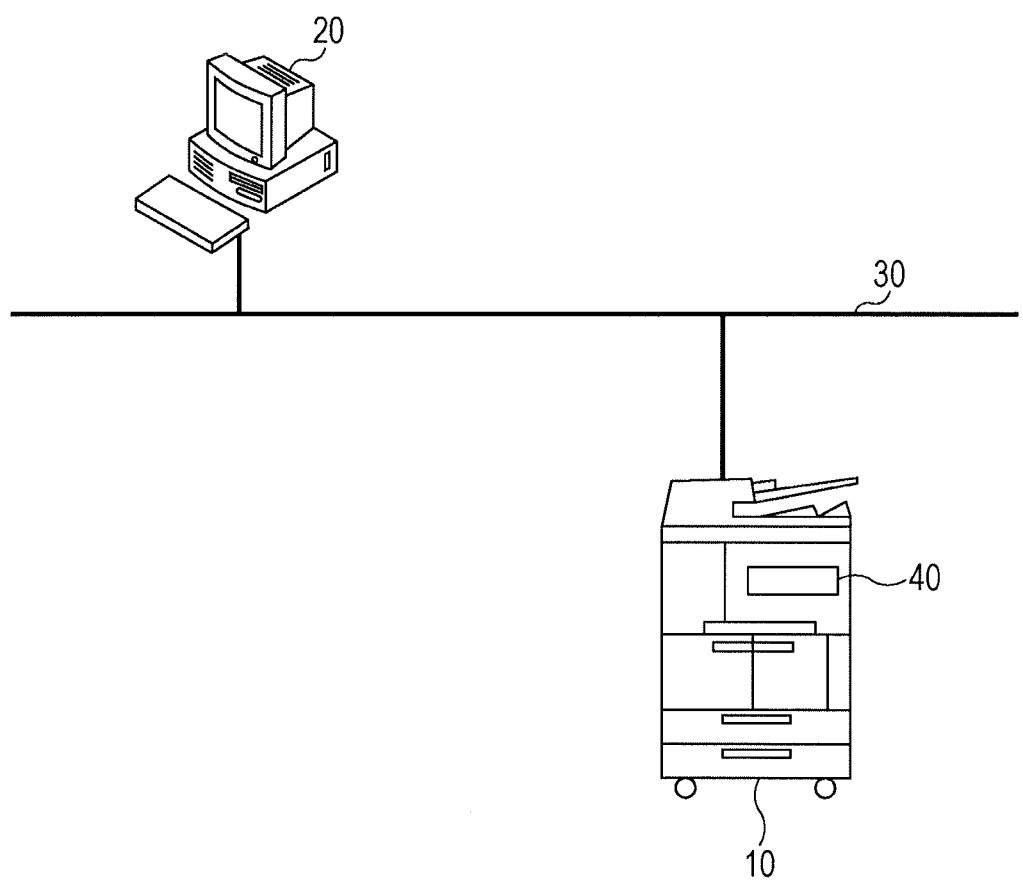
FIG. 1 illustrates an exemplary configuration of an image forming system of a first exemplary embodiment of the present invention.

FIG. 1 illustrates an exemplary configuration of an image forming system of a first exemplary embodiment of the present invention.

Referring to FIG. 1, the image forming system of the first exemplary embodiment of the present invention includes an image forming apparatus 10 and a terminal apparatus 20, which are connected to each other via a network 30. The terminal apparatus 20 generates print data and transmits the generated print data to the image forming apparatus 10 via the network 30. The image forming apparatus 10 receives the print data transmitted from the terminal apparatus 20 to output an image corresponding to the print data on a sheet. The image forming apparatus 10 is an apparatus called a multi-function peripheral having multiple functions including a print function, a scan function, a copy function, and a facsimile function.

The image forming apparatus 10 may have a difference image generating apparatus 40 added thereto as an optional function. The difference image generating apparatus 40 has a function to receive two pieces of image data to be compared with each other, such as new drawing data and old drawing data, detect the difference between the new drawing data and the old drawing data, and output, for example, display the detected difference using one piece of image data. For example, the difference image generating apparatus 40 may display a portion that exists in the old drawing but is deleted in the new drawing in red and displays a portion that does not exist in the old drawing but is added in the new drawing in blue to display the difference between the new drawing data and the old drawing data in one piece of image data. In the display of the difference, a portion where the difference is detected may be surrounded by a rectangular frame to present the portion where the difference is detected to a user.

Specifically, the difference image generating apparatus 40 first converts two pieces of drawing data to be compared with each other into binary image data and sequentially compares the corresponding pixels with each other to detect the difference between the two pieces of drawing data.

When two drawings on sheets of paper are to be compared with each other, the images of the drawings are scanned by a scanner in the image forming apparatus 10 to convert the images into pieces of image data and the pieces of image data are supplied to the difference image generating apparatus 40 to detect the difference.

Then, the image forming apparatus 10 prints an image generated on the basis of difference image data generated by the difference image generating apparatus 40 on a print sheet or the like for output.

Figure 2:
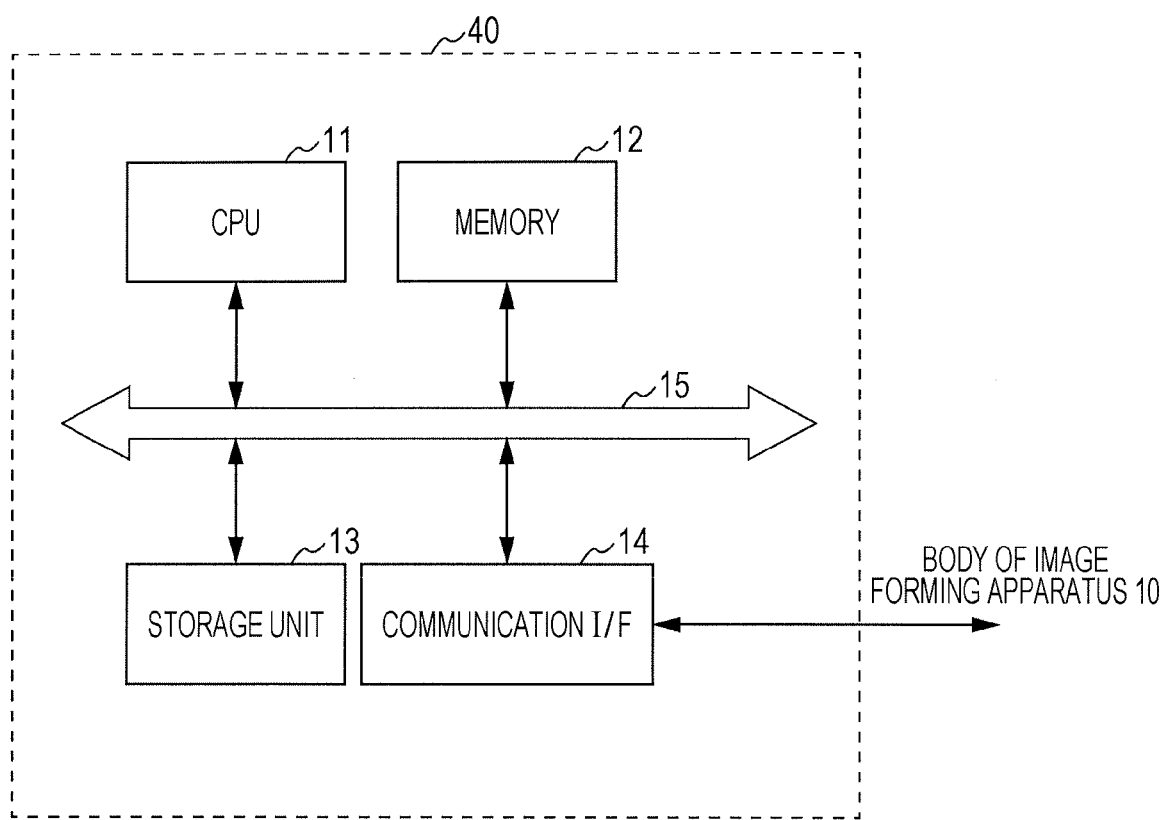
FIG. 2 is a block diagram illustrating an exemplary hardware configuration of a difference image generating apparatus in the first exemplary embodiment of the present invention.

FIG. 2 is a block diagram illustrating an exemplary hardware configuration of the difference image generating apparatus 40 in the image forming system of the first exemplary embodiment.

Referring to FIG. 2, the difference image generating apparatus 40 includes a central processing unit (CPU) 11, a memory 12, a storage unit 13 such as a hard disk drive (HDD), and a communication interface (I/F) 14 that transmits and receives data to and from the body of the image forming apparatus 10. These components are connected to each other via a control bus 15.

The CPU 11 executes predetermined processing on the basis of a control program stored in the memory 12 or the storage unit 13 to control the operation of the difference image generating apparatus 40.

Although the CPU 11 reads out the control program stored in the memory 12 or the storage unit 13 for execution in the description of the exemplary embodiment, the control program may be stored on a storage medium, such as a compact disk-read only memory (CD-ROM), to be provided to the CPU 11.

Figure 3:
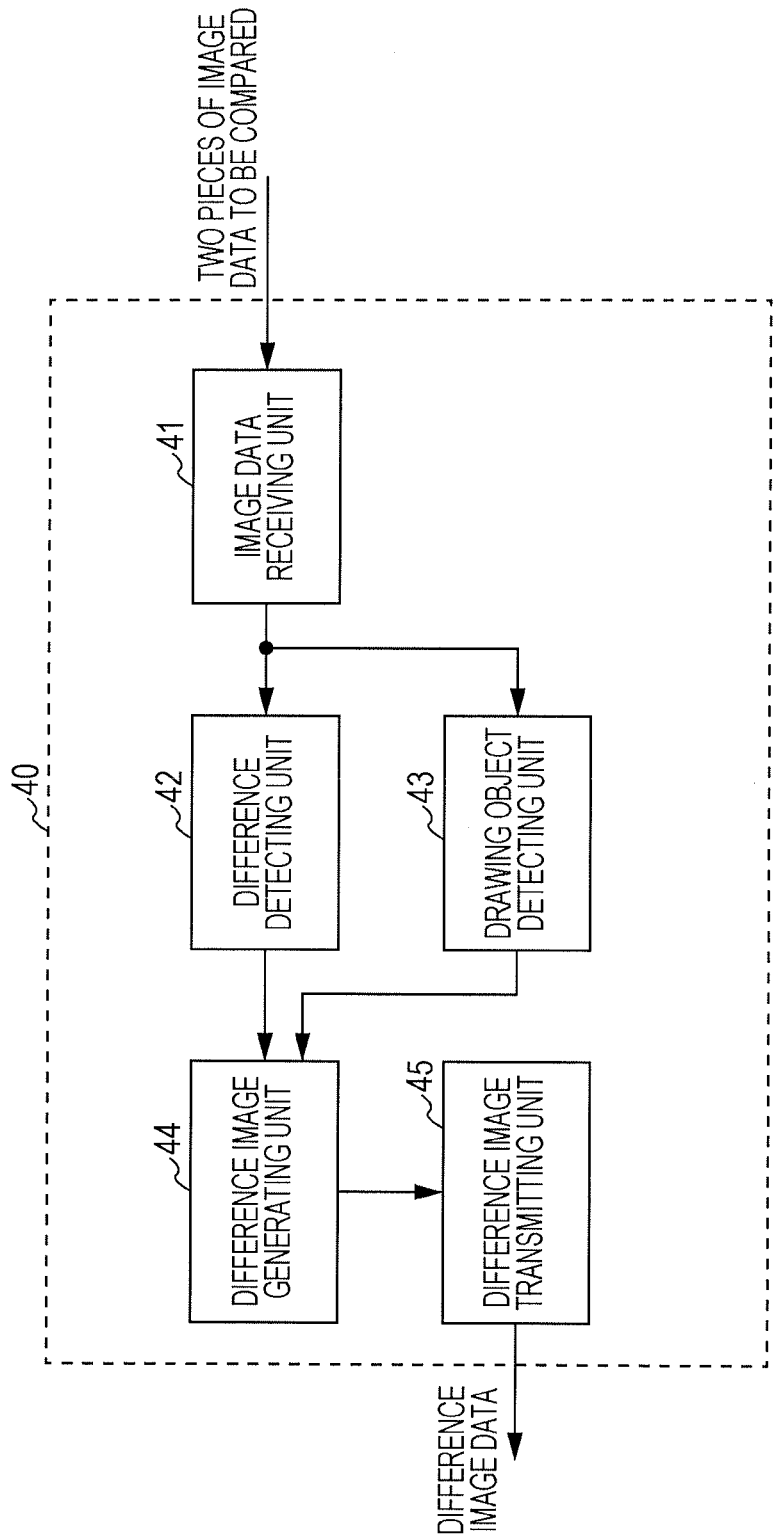
FIG. 3 is a block diagram illustrating an exemplary functional configuration of the difference image generating apparatus in the first exemplary embodiment of the present invention.

FIG. 3 is a block diagram illustrating an exemplary functional configuration of the difference image generating apparatus 40 realized by the control program that is executed.

Referring to FIG. 3, the difference image generating apparatus 40 of the present exemplary embodiment includes an image data receiving unit 41, a difference detecting unit 42, a drawing object detecting unit 43, a difference image generating unit 44, and a difference image transmitting unit 45.

The image data receiving unit 41 receives the two pieces of image data to be compared with each other from the image forming apparatus 10 or the terminal apparatus 20. Specifically, the image data receiving unit 41 may receive the image data read out by the scanner in the image forming apparatus 10 or may directly import an electronic document in, for example, a portable document format (PDF) from the terminal apparatus 20, which is a personal computer (PC) or the like. The pieces of image data to be compared with each other may have a vector format or an image format.

Although a case in which the new drawing data and the old drawing data are used as the two pieces of image data to be compared with each other is described in the following description, the pieces of image data to be compared with each other are not limited to the pieces of drawing data.

The difference detecting unit 42 detects the difference between the two pieces of image data received by the image data receiving unit 41. Specifically, as described above, the difference detecting unit 42 sequentially compares the pixels in the two pieces of image data to be compared with each other to detect the difference (a difference portion or a modified portion) between the two pieces of image data.

Specifically, in the comparison between the image data on the new drawing and the image data on the old drawing, the difference detecting unit 42 generates difference information for the pieces of image data on the new and old drawings and transmits the difference information to the difference image generating unit 44 along with the image data on a portion common to the new and old drawings. The difference information is composed of an image resulting from drawing of a portion that did not exist in the old drawing and that has been added in the new drawing and an image resulting from drawing of a portion that existed in the old drawing and that has been deleted in the new drawing. The image resulting from drawing of the added portion and the image resulting from drawing of the deleted portion may be integrated into one image for the entire drawing or may be divided images for the respective portions where the difference is detected.

The drawing object detecting unit 43 analyzes the pieces of image data on the new and old drawings to be compared with each other, which are received by the image data receiving unit 41, to detect the following drawing objects (drawing elements) included in the pieces of image data:
 (1) Dotted object (character or graphic)
 (2) Character (that is not dotted)
 (3) Graphic (that is not dotted)

Specifically, the drawing object detecting unit 43 identifies each drawing object in the following manner:
 (1) A character code, a character position, and a drawing area are detected using, for example, an optical character reader (OCR) technology. The character code and coordinate information about a rectangle surrounding the shape of the character, which result from the detection, are stored as character drawing information.
 (2) The character drawing information acquired in (1) is used to generate an image resulting from exclusion of the area where the character is drawn from the image data.
 (3) A dotted area in the image data acquired in (2) is detected. Specifically, the image data is divided into predetermined blocks, it is determined whether the bit pattern of each block coincides with a predetermined pattern, and the block the bit pattern of which coincides with the predetermined pattern is stored as dotted information in association with the pattern.

The character drawing information and the dotted information are acquired for the new drawing data and the old drawing data through the above procedure. The drawing object detecting unit 43 transmits the character drawing information and the dotted information to the difference image generating unit 44 as drawing object information.

The difference image generating unit 44 generates the difference image data using the drawing object information detected by the drawing object detecting unit 43, the difference information detected by the difference detecting unit 42, and the image data common to the new and old drawings. Specifically, the difference image generating unit 44 reflects the difference information in the image data common to the new and old drawings to generate the image indicating only the difference in the shape of the drawing object. The difference image generating unit 44 overwrites the difference image in the shape with an auxiliary image making the result of the detection of the generated difference easy to recognize to generate the difference image data.

If the drawing object in the image data where the difference is detected by the difference detecting unit 42 is a drawing object for which it is estimated to be difficult to identify the content of modification in the display of the difference, the difference image generating unit 44 generates the difference image data indicating the difference between the two pieces of image data to be compared with each other by adding the auxiliary image to present the content of the detected difference to the user in a highlight manner.

The drawing object for which it is estimated to be difficult to identify the content of modification in the display of the difference is exemplified by, for example, the character or the dotted drawing object. When the drawing object where the difference is detected is the character or the dotted drawing object, the difference image generating unit 44 generates the difference image data by adding the auxiliary image indicating that the character has been modified or the auxiliary image indicating that the dotted pattern has been modified.

The difference image transmitting unit 45 transmits the difference image data generated by the difference image generating unit 44 to the image forming apparatus 10. The image forming apparatus 10 receives the difference image data from the difference image transmitting unit 45 to output an image on a print sheet.

The reason why the drawing object for which it is estimated to be difficult to identify the content of modification in the display of the difference is exemplified by the character or the dotted drawing object will now be described with reference to FIG. 4 and FIG. 5.

Figure 4:
FIG. 4 illustrates an exemplary case in which the difference is indicated using an added portion and a deleted portion when a dimension line in drawing data and a number indicating the dimension have been modified.

FIG. 4 illustrates an exemplary case in which the difference is indicated using an added portion and a deleted portion when a dimension line in drawing data and a number indicating the dimension have been modified.

In the example illustrated in FIG. 4, the dimension line is reduced in length and the number indicating the dimension is modified from "17" to "14." Although the reduction in length of the dimension line is easily recognizable even if only the added portion and the deleted portion are indicated, it is difficult to recognize the modification in the number because the numbers are overlapped with each other.

Figure 5:
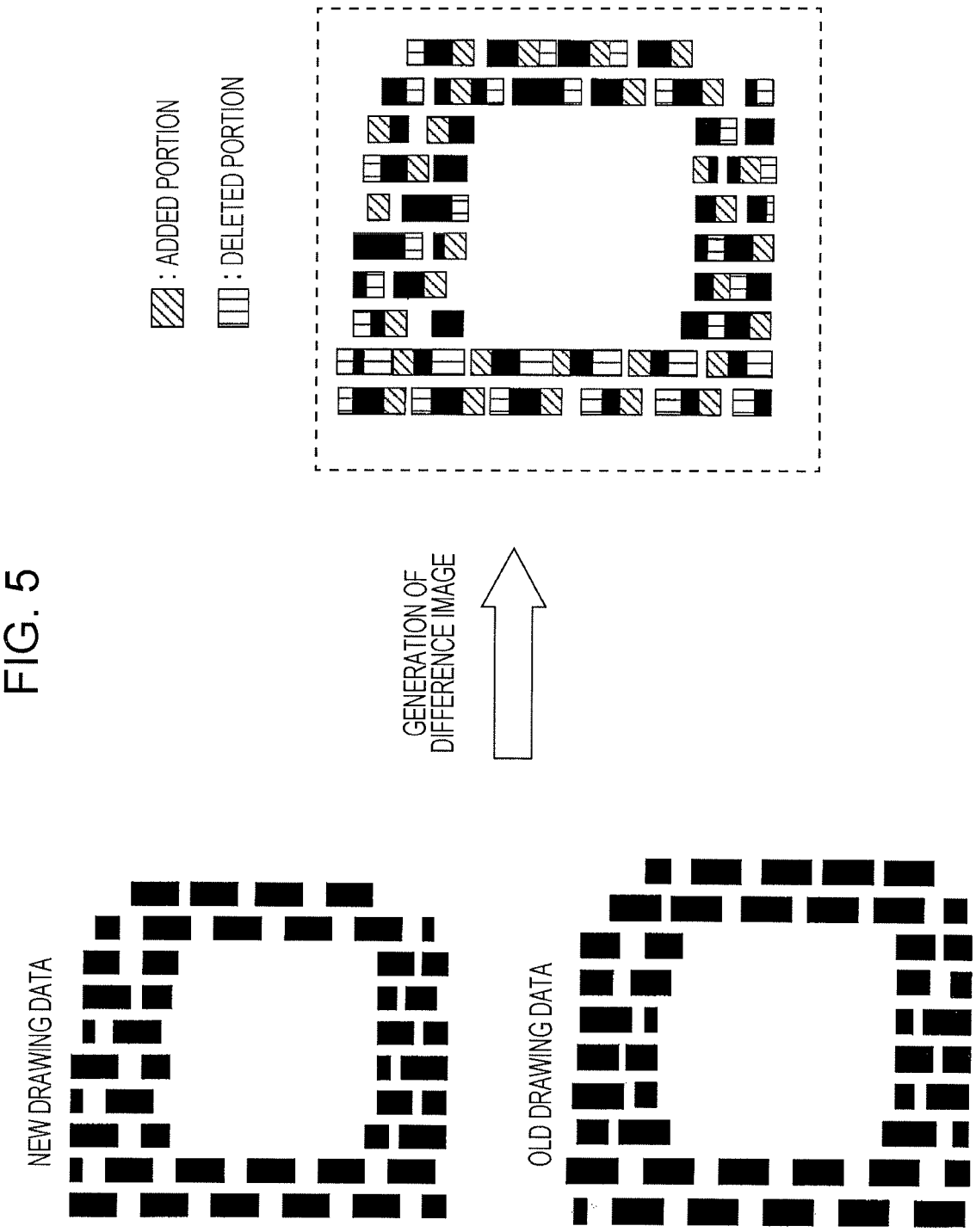
FIG. 5 illustrates an exemplary case in which the difference in a dotted character is indicated using added portions and deleted portions.

FIG. 5 illustrates an exemplary case in which the difference in a dotted character "D" is indicated using added portions and deleted portions.

Referring to FIG. 5, since the dotted pattern of the new drawing data is vertically shifted from the dotted pattern of the old drawing data, a minor difference in the dotted pattern is displayed despite the fact that the shape of the character does not change and it is difficult to recognize what has been modified. The difference in the dotted pattern may occur in a process of copying or faxing the drawing. The difference in a binarization process of multiple-value data may cause the difference in the dotted pattern.

Figure 6:
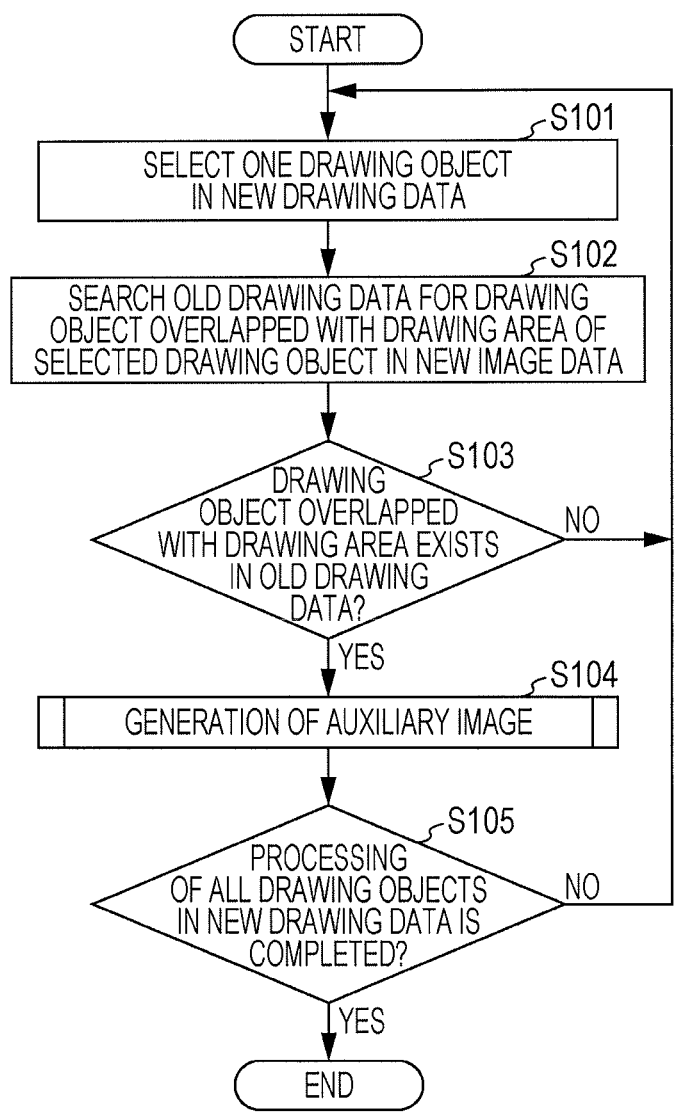
FIG. 6 is a flowchart illustrating an exemplary operational process performed by a difference image generating unit to generate difference image data.

FIG. 6 is a flowchart illustrating an exemplary process performed by the difference image generating unit 44. The process in FIG. 6 illustrates an operation by the difference image generating unit 44 to generate the difference image data using the drawing object information detected by the drawing object detecting unit 43, the difference information detected by the difference detecting unit 42, and the image data common to the new and old drawings.

Referring to FIG. 6, in Step S101, the difference image generating unit 44 selects one drawing object in the new drawing data. In Step S102, the difference image generating unit 44 searches the old drawing data for the drawing object overlapped with the drawing area of the selected drawing object in the new drawing data. In Step S103, the difference image generating unit 44 determines whether the drawing object overlapped with the drawing area exists in the old drawing data.

If the difference image generating unit 44 determines that the drawing object overlapped with the drawing area of the selected drawing object does not exist in the old drawing data (NO in Step S103), the process goes back to Step S101. In Step S101, the difference image generating unit 44 selects the next drawing object in the new drawing data to repeat the above processing.

If the difference image generating unit 44 determines that the drawing object overlapped with the drawing area of the selected drawing object exists in the old drawing data (YES in Step S103), in Step S104, the difference image generating unit 44 performs generation of the auxiliary image. The generation of the auxiliary image will be described below with reference to FIG. 7.

In Step S105, the difference image generating unit 44 determines whether the processing of all the drawing objects in the new drawing data is completed. Steps S101 to S104 are repeated until all the drawing objects in the new drawing data are selected.

Figure 7:
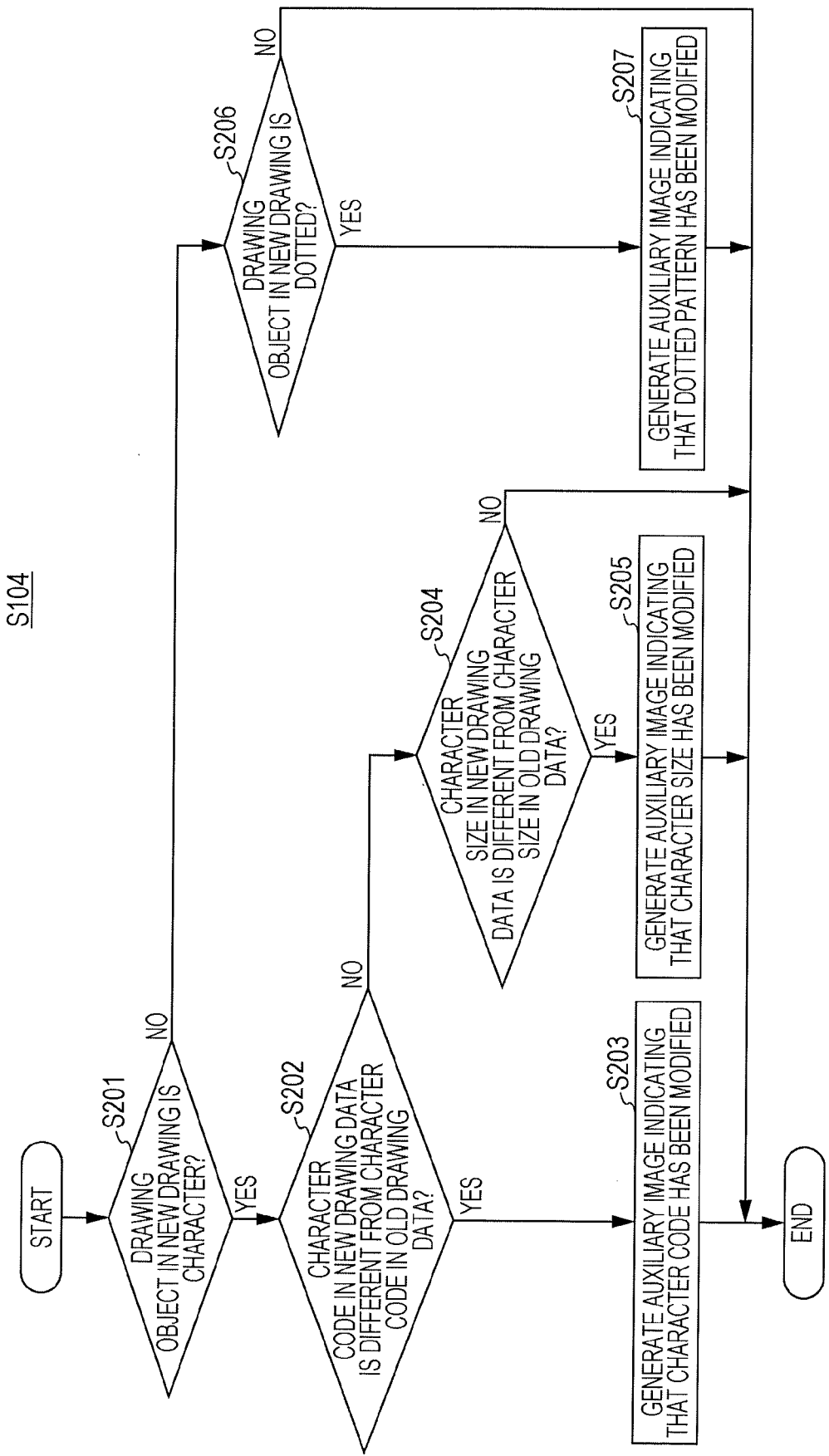
FIG. 7 is a flowchart illustrating an exemplary process of generation of auxiliary image in FIG. 6 in detail.

FIG. 7 is a flowchart illustrating an exemplary process of the generation of the auxiliary image (Step S104) in FIG. 6 in detail.

Referring to FIG. 7, in Step S201, the difference image generating unit 44 determines whether the drawing object in the new drawing data is a drawing object of a character.

If the difference image generating unit 44 determines that the drawing object in the new drawing data is a drawing object of a character (YES in Step S201), in Step S202, the difference image generating unit 44 determines whether the character code of the character in the new drawing data is different from the character code of the character in the old drawing data.

If the difference image generating unit 44 determines that the character code of the character in the new drawing data is different from the character code of the character in the old drawing data (YES in Step S202), in Step S203, the difference image generating unit 44 generates the auxiliary image indicating that the character code has been modified.

Figure 8:
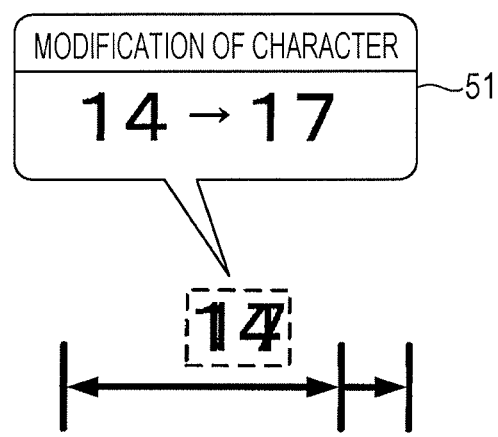
FIG. 8 illustrates an example in which an auxiliary image indicating that a character code has been modified is displayed along with the difference in the shape of a graphic when the graphic is modified.
Figure 9:
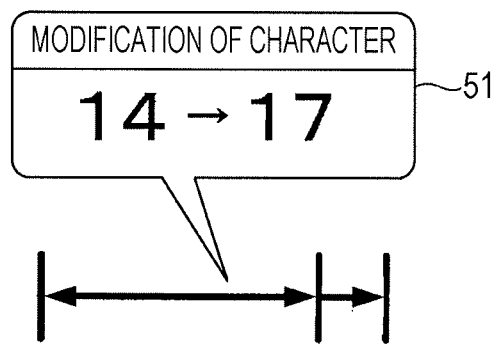
FIG. 9 illustrates an example in which only the auxiliary image indicating that the character code has been modified is displayed without the difference in the shape of the graphic when the graphic is modified.

FIG. 8 and FIG. 9 illustrate examples of the auxiliary image indicating that the character code has been modified, generated by the difference image generating unit 44.

FIG. 8 illustrates an example in which an auxiliary image 51 indicating that the character code has been modified is displayed along with the difference in the shape of a graphic when the graphic is modified. FIG. 9 illustrates an example in which only the auxiliary image 51 indicating that the character code has been modified is displayed without the difference in the shape of the graphic when the graphic is modified.

In the examples in FIG. 8 and FIG. 9, the difference image generating unit 44 adds the auxiliary image 51 in which the characters before and after modification are indicated using the character codes to the difference image data when the difference image generating unit 44 generates the difference image data by adding the auxiliary image indicating that the character has been modified.

Referring back to FIG. 7, if the difference image generating unit 44 determines that the character code of the character in the new drawing data is the same as the character code of the character in the old drawing data (NO in Step S202), in Step S204, the difference image generating unit 44 determines whether the character size in the new drawing data is different from the character size in the old drawing data.

Although the difference image generating unit 44 may not generate the auxiliary image when the character code and the character size in the new drawing data are the same as those in the old drawing data, the difference image generating unit 44 may generate the auxiliary image indicating that the generated character has been modified using an image of the character to add the auxiliary image to the difference image data.

Figure 10:
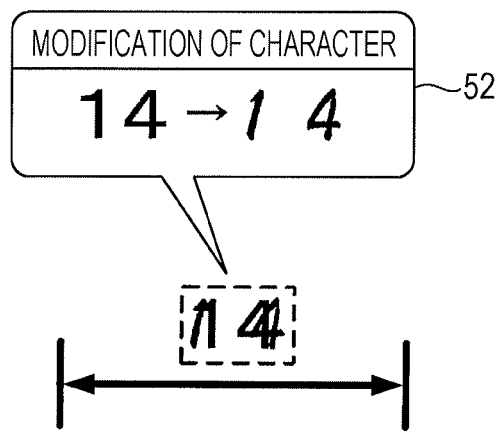
FIG. 10 illustrates an example in which an auxiliary image indicating that a character has been modified, by using an image of the character itself, is displayed along with the difference in the shape of the graphic when the graphic is modified.

FIG. 10 illustrates an example in which an auxiliary image 52 indicating that a character has been modified, by using an image of the character itself, is displayed along with the difference in the shape of the graphic when the graphic is modified.

In the example in FIG. 10, the difference image generating unit 44 adds the auxiliary image 52 in which the characters before and after modification are indicated using images to the difference image data when the difference image generating unit 44 generates the difference image data by adding the auxiliary image indicating that the character has been modified. The generation of the auxiliary image using the images allows the content of the medication including the change in the font to be indicated to the user.

Referring back to FIG. 7, if the difference image generating unit 44 determines that the character size in the new drawing data is different from the character size in the old drawing data (YES in Step S204), in Step S205, the difference image generating unit 44 generates the auxiliary image indicating that the character size has been modified.

Specifically, the difference image generating unit 44 adds the auxiliary image indicating the character sizes before and after modification to the difference image data if the character code after modification is the same as that before modification and only the character size after modification is different from that before modification when the difference image generating unit 44 generates the difference image data by adding the auxiliary image indicating that the character has been modified to.

Figure 11:
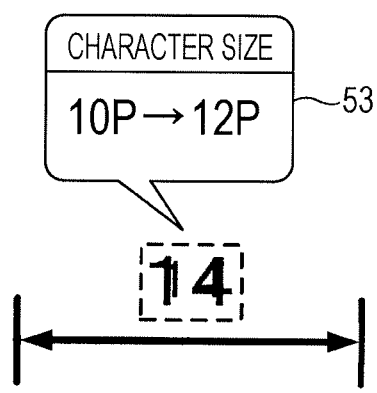
FIG. 11 illustrates an example of an auxiliary image indicating character sizes before and after modification.

FIG. 11 illustrates an example of an auxiliary image 53 indicating the character sizes before and after modification. Although the character code "14" has not been modified in the example in FIG. 11, it is recognizable that the character size has been modified from 10 points to 12 points.

Referring back to FIG. 7, if the difference image generating unit 44 determines that the drawing object in the new drawing data is not a drawing object of a character (NO in Step S201), in Step S206, the difference image generating unit 44 determines whether the drawing object in the new drawing data is a dotted drawing object.

If the difference image generating unit 44 determines that the drawing object in the new drawing data is a dotted drawing object (YES in Step S206), in Step S207, the difference image generating unit 44 generates the auxiliary image indicating that the dotted pattern has been modified. After Step S203, Step S205, and Step S207, the process illustrated in FIG. 7 is terminated.

Figure 12:
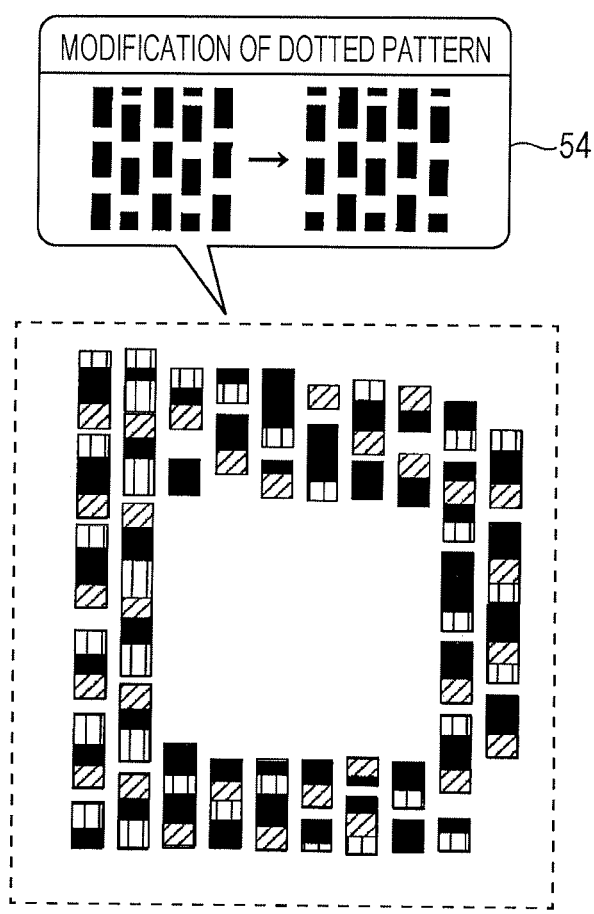
FIG. 12 illustrates an example of an auxiliary image indicating that a dotted pattern has been modified.

FIG. 12 illustrates an example of an auxiliary image 54 indicating that the dotted pattern has been modified. The user is capable of recognizing that the modification in the dotted character "D" results from the modification in the dotted pattern with reference to the example in FIG. 12.

Second Exemplary Embodiment

Figure 13:
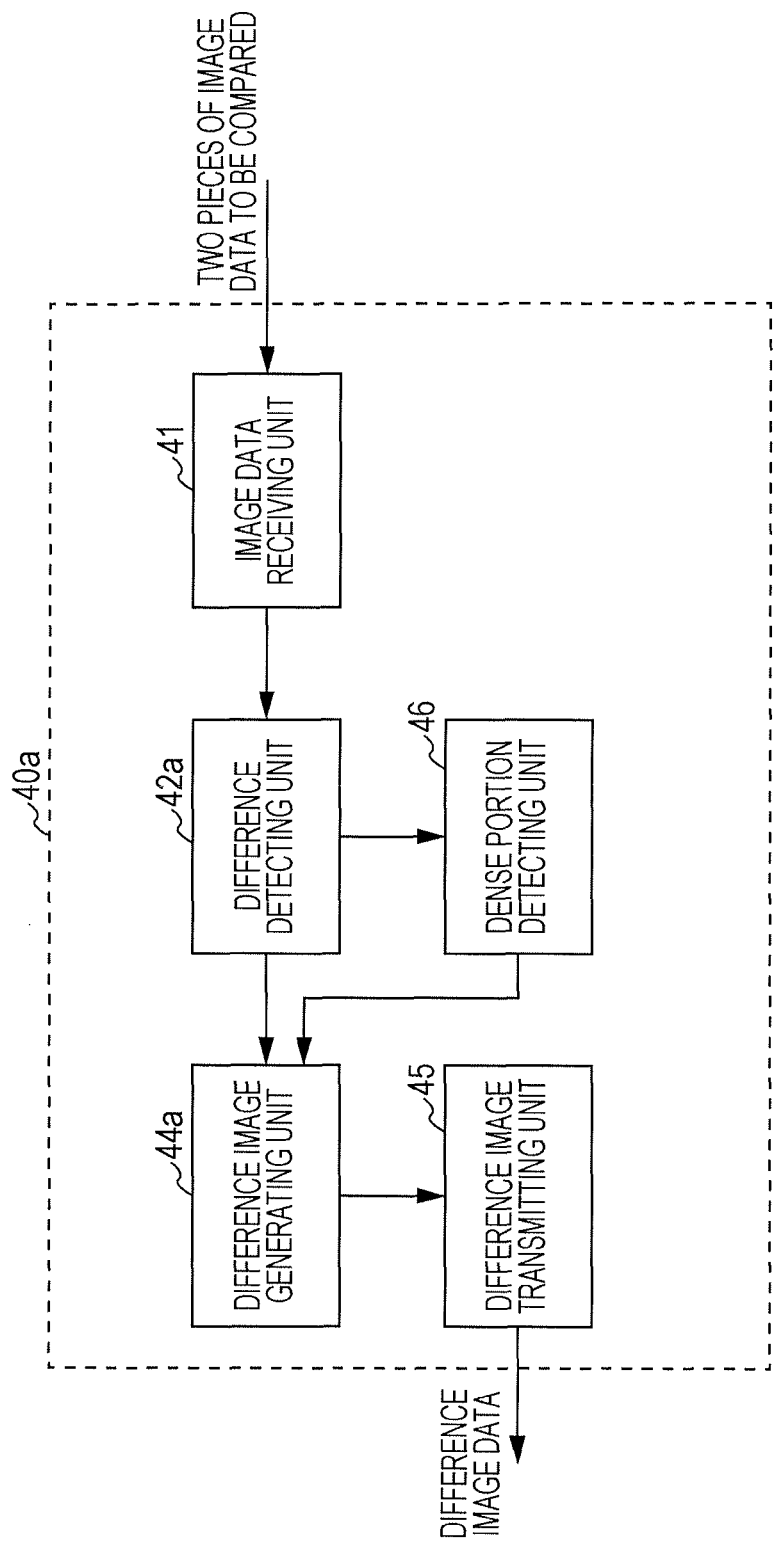
FIG. 13 is a block diagram illustrating an exemplary functional configuration of a difference image generating apparatus in a second exemplary embodiment of the present invention.

An image forming system of a second exemplary embodiment of the present invention will now be described. In the image forming system of the second exemplary embodiment, the difference image generating apparatus 40 in the image forming system of the first exemplary embodiment illustrated in FIG. 1 is replaced with a difference image generating apparatus 40a illustrated in FIG. 13.

The difference image generating apparatus 40a of the second exemplary embodiment includes a difference detecting unit 42a and a difference image generating unit 44a, instead of the difference detecting unit 42 and the difference image generating unit 44 in the difference image generating apparatus 40 of the first exemplary embodiment illustrated in FIG. 3, and includes a dense portion detecting unit 46, instead of the drawing object detecting unit 43 in the difference image generating apparatus 40 of the first exemplary embodiment illustrated in FIG. 3. The same reference numerals are used in FIG. 13 to identify the same components illustrated in FIG. 3. A description of such components is omitted herein.

The difference detecting unit 42a in the second exemplary embodiment detects the difference between the two pieces of image data received by the image data receiving unit 41, as in the difference detecting unit 42 illustrated in FIG. 3. However, the difference detecting unit 42a differs from the difference detecting unit 42 in FIG. 3 in that the difference detecting unit 42a supplies the difference information to the dense portion detecting unit 46.

The dense portion detecting unit 46 is a unit that detects a portion that is dense with modified dots. The dense portion detecting unit 46 refers to the difference information supplied from the difference detecting unit 42a to detect a portion for which it is estimated to be difficult to identify the content of modification in the display of the difference, among the portions in the image data where the difference is detected.

Specifically, if the area (the number of dots) of the portion where the difference is detected is lower than or equal to a predetermined value, the dense portion detecting unit 46 detects the portion as the portion for which it is estimated to be difficult to identify the content of modification in the display of the difference. For example, if the number of dots in the portion where the difference is detected is smaller than or equal to 400, the dense portion detecting unit 46 determines the portion to be the portion that is dense with modified parts to such an extent that it will be difficult to identify the content of modification in the display of the difference.

In order to calculate the area of the portion where the difference is detected, for example, a method of calculating a circumscribed rectangle of the data where the difference is detected to set the area of the circumscribed rectangle as the area of the portion where the difference is detected is proposed. The area of the portion is capable of being represented with the number of dots if the resolution is determined.

If the area of the portion where the difference is detected is smaller than or equal to the predetermined value, the difference image generating unit 44a adds an enlarged image of the portion where the difference is detected to the difference image data as the auxiliary image.

The dense portion detecting unit 46 may detect the portion for which it is estimated to be difficult to identify the content of modification in the display of the difference on the basis of the area (the number of dots) of the portion where the difference is detected and the ratio of the number of pixels where the difference is detected to the (total) number of pixels in the portion. For example, if the number of dots in the portion where the difference is detected is smaller than or equal to 700 and the ratio of the number of modified dots (the sum of the number of added dots and the number of deleted dots) with respect to the total number of dots is higher than or equal to 20%, the dense portion detecting unit 46 determines the portion to be the portion that is dense with modified parts to such an extent that it will be difficult to identify the content of modification in the display of the difference.

In this case, the difference image generating unit 44a adds the enlarged image of the portion where the difference is detected to the difference image data as the auxiliary image on the basis of the area of the portion where the difference is detected and the ratio of the pixels in the portion where the difference is detected.

The difference image generating unit 44a may add the enlarged image of the portion where the difference is detected to the difference image data as the auxiliary image only if the difference image data is reduced in size, compared with the two pieces of image data to be compared with each other. For example, the difference image generating unit 44a may add the auxiliary image to the difference image data only when the two pieces of image data to be compared with each other have A0 size and the difference image data has A3 size.

Figure 14:
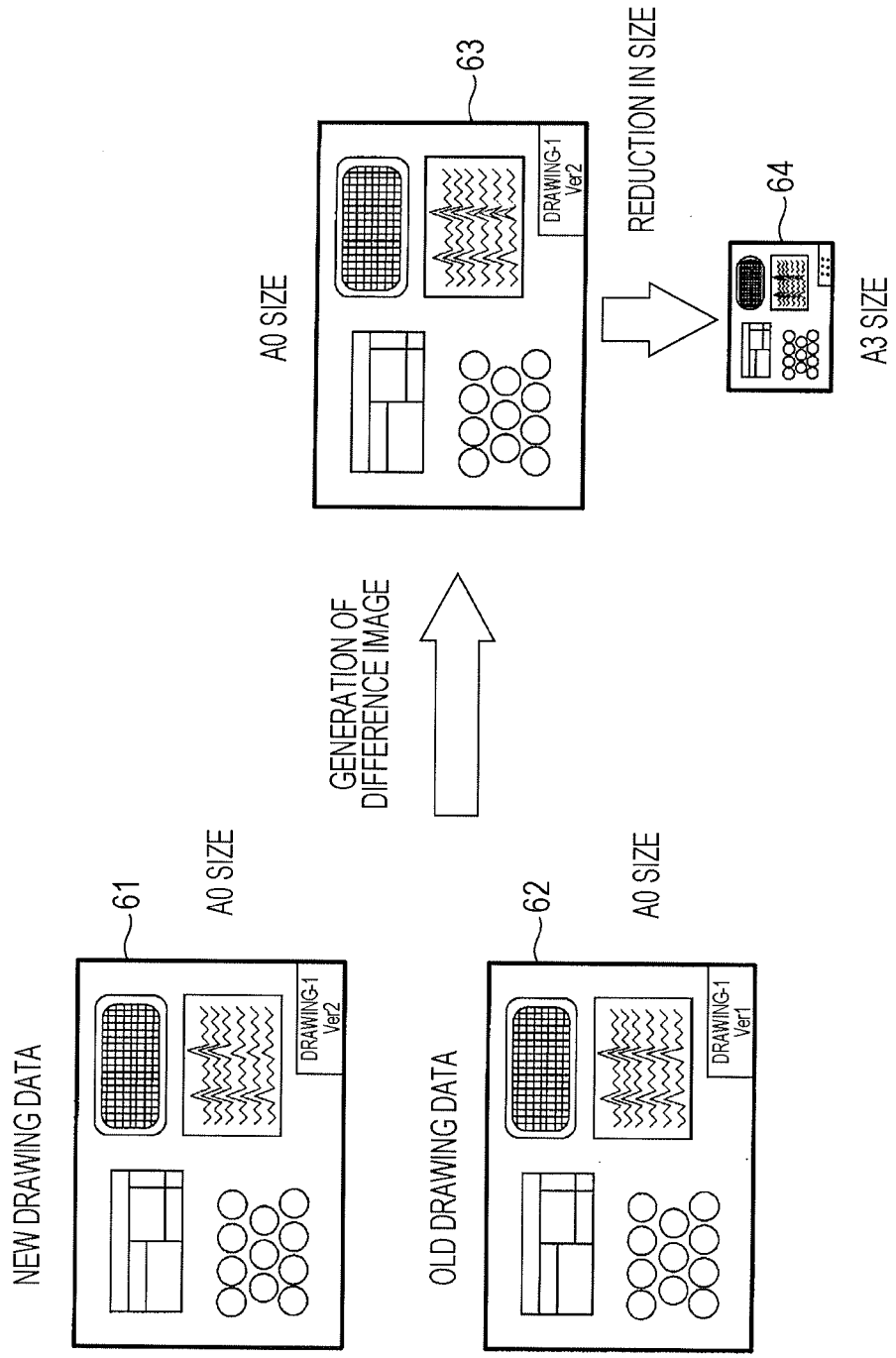
FIG. 14 is a diagram for describing how the difference image data is generated on the basis of old drawing data and new drawing data of A0 size.

Specifically, when new drawing data 61 and old drawing data 62 to be compared with each other have A0 size and difference image data 63 that is generated has A0 size as in an example illustrated in FIG. 14, it is necessary to reduce the difference image to a printable size, as in difference image data 64 of A3 size, in order to print the difference image on a print sheet. Accordingly, only if the difference image data is reduced to, for example, A3 size, compared with the two pieces of image data to be compared with each other which have A0 size, the difference image generating unit 44a may add the auxiliary image to the difference image data.

Figure 15:
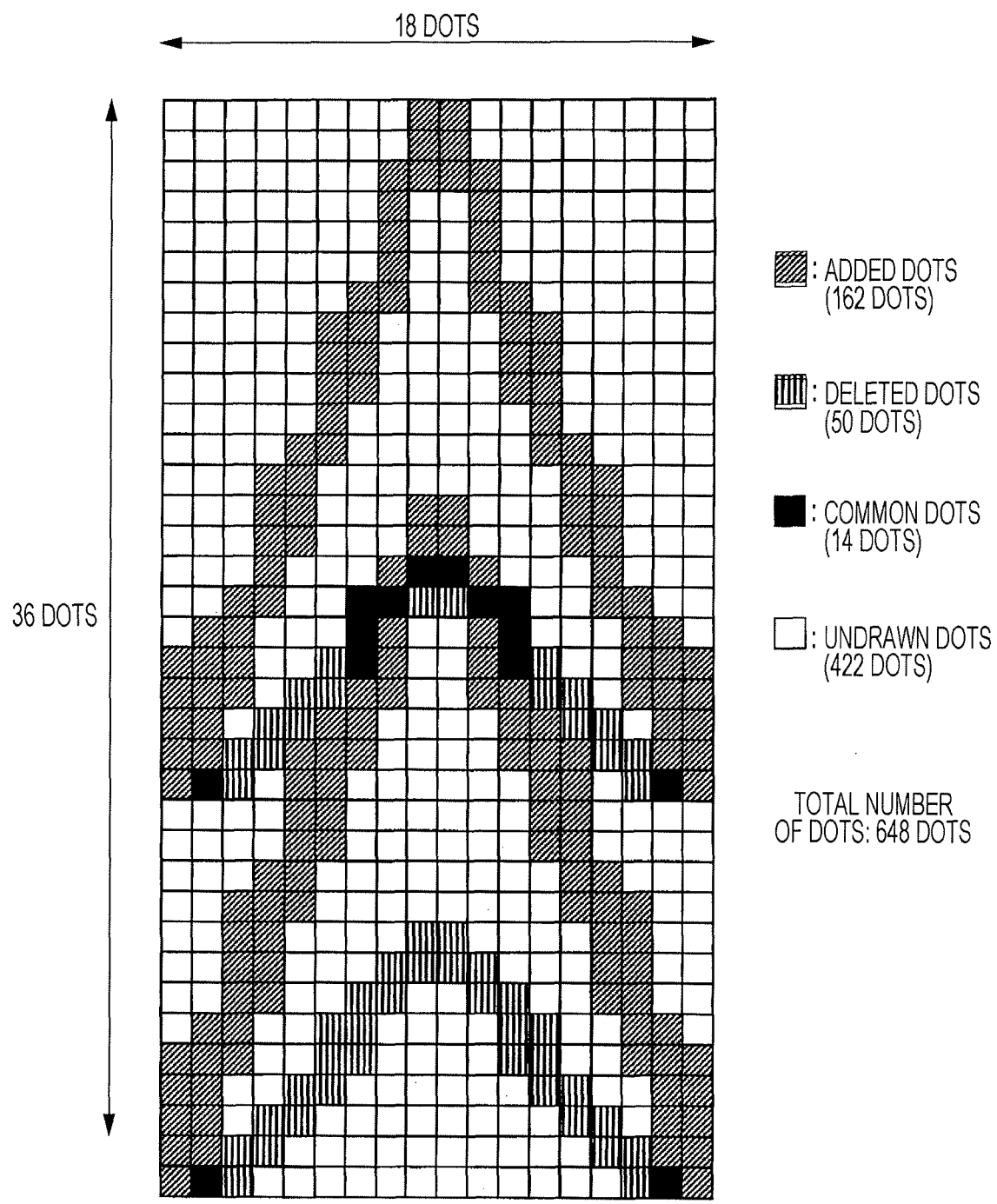
FIG. 15 illustrates a specific example in a case in which a dense portion detecting unit detects a portion for which it is estimated to be difficult to identify the content of modification in the display of the difference on the basis of the number of dots in a portion where the difference is detected and the ratio of the pixels in the portion where the difference is detected.

FIG. 15 illustrates a specific example in the case in which the dense portion detecting unit 46 detects the portion for which it is estimated to be difficult to identify the content of modification in the display of the difference on the basis of the number of dots in the portion where the difference is detected and the ratio of the pixels in the portion where the difference is detected.

For example, a case will now be described in which the portion where the difference is detected by the difference detecting unit 42a is a portion illustrated in FIG. 15. In the case in FIG. 15, the total number of dots in the portion where the difference is detected is 648 (18×36), the number of added dots is 162, the number of deleted dots is 50, the number of common dots is 14, and the number of undrawn dots is 422.

In the case illustrated in FIG. 15, the number of modified dots is 212 (the number of added dots (162)+the number of deleted dots (50)). Accordingly, the ratio of the number of modified dots with respect to the total number of dots is 212/648≈33%.

In the example illustrated in FIG. 15, since the total number of dots is 648, which is smaller than or equal to 700, and the ratio of the number of modified dots with respect to the total number of dots is 33%, which is higher than or equal to 20%, the dense portion detecting unit 46 determines the portion to be a portion that is dense with modified parts and a portion to which the auxiliary image should be added.

Figure 16:
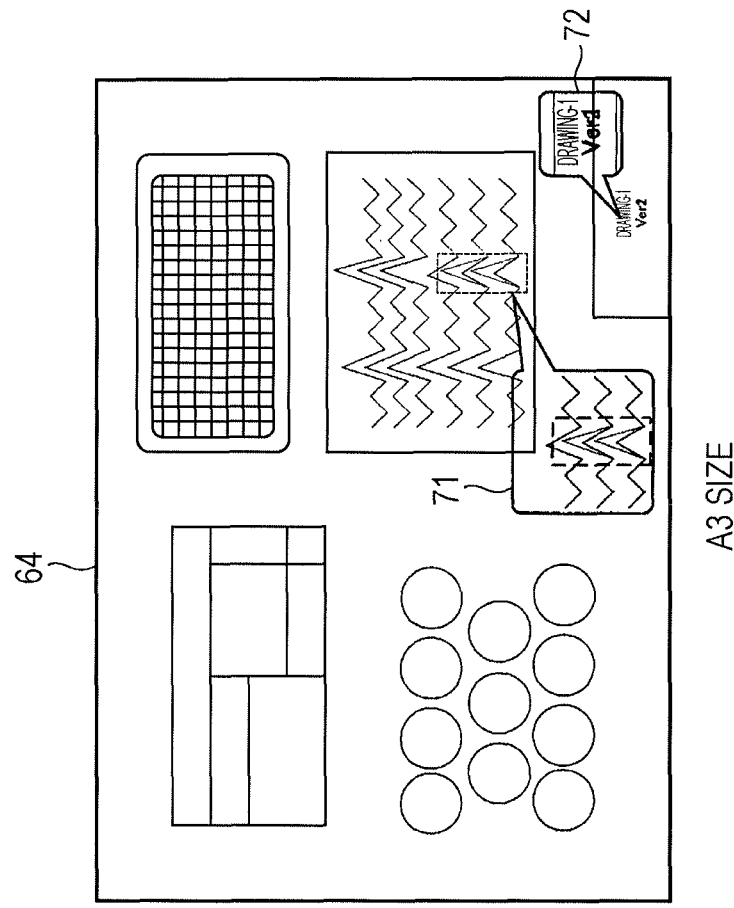
FIG. 16 illustrates an example in which auxiliary images are added near portions where the differences are detected.

The difference image generating unit 44a adds the enlarged image of the portion where the difference is detected to a blank area near the portion detected as the portion dense with modified parts as the auxiliary image. For example, the difference image generating unit 44a generates the difference image data in which auxiliary images 71 and 72 are added near the portions where the differences are detected, as in an example illustrated in FIG. 16.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a receiving unit that receives two pieces of image data to be compared with each other;
    a detecting unit that detects a difference between the two pieces of image data received by the receiving unit; and
    a generating unit that, if a drawing element in the image data where the difference is detected by the detecting unit is dense with modified parts to such an extent that it is estimated to be difficult to identify the content of modification in the display of the difference, generates difference image data indicating the difference between the two pieces of image data for comparison by adding an auxiliary image to highlight the content of the detected difference.

2. The image processing apparatus according to claim 1, wherein, if the drawing element with the detected difference is a character or a dotted drawing element, the generating unit generates the difference image data by adding an auxiliary image which indicates that the character has been modified or an auxiliary image which indicates that a dotted pattern has been modified.

3. The image processing apparatus according to claim 2, wherein, when the generating unit generates the difference image data by adding the auxiliary image which indicates that the character has been modified, the generating unit adds an auxiliary image indicating the character before modification and the character after modification using character codes.

4. The image processing apparatus according to claim 2, wherein, when the generating unit generates the difference image data by adding the auxiliary image which indicates that the character has been modified, the generating unit adds an auxiliary image indicating the character before modification and the character after modification using images.

5. The image processing apparatus according to claim 2, wherein, when the generating unit generates the difference image data by adding the auxiliary image which indicates that the character has been modified, if the character before modification and the character after modification have an identical character code and have different character sizes, the generating unit adds an auxiliary image indicating the character size of the character before modification and the character size of the character after modification.

6. An image processing apparatus comprising:
    a receiving unit that receives two pieces of image data to be compared with each other;
    a detecting unit that detects a difference between the two pieces of image data received by the receiving unit; and
    a generating unit that, if portions in the image data where the difference is detected by the detecting unit are portions overlapped with each other and are portions for which it is estimated to be difficult to identify the content of modification in the display of the difference, generates difference image data indicating the difference between the two pieces of image data for comparison by adding an auxiliary image to highlight the content of the detected difference.

7. The image processing apparatus according to claim 6, wherein, if an area of the portion where the difference is detected is lower than or equal to a predetermined value, the generating unit adds an enlarged image of the portion where the difference is detected to the difference image data as the auxiliary image.

8. The image processing apparatus according to claim 6, wherein the generating unit adds an enlarged image of the portion where the difference is detected to the difference image data as the auxiliary image on a basis of the area of the portion where the difference is detected and a ratio of the pixels in the portion where the difference is detected.

9. The image processing apparatus according to claim 6, wherein, if the difference image data is reduced, compared with the two pieces of image data to be compared with each other, the generating unit adds an enlarged image of the portion where the difference is detected to the difference image data as the auxiliary image.

10. An image forming apparatus comprising:
a receiving unit that receives two pieces of image data to be compared with each other;
a detecting unit that detects a difference between the two pieces of image data received by the receiving unit;
a generating unit that, if a drawing element in the image data where the difference is detected by the detecting unit is dense with modified parts to such an extent that it is estimated to be difficult to identify the content of modification in the display of the difference, generates difference image data indicating the difference between the two pieces of image data by adding an auxiliary image for comparison to highlight the content of the detected difference; and
an output unit that outputs an image on a basis of the difference image data generated by the generating unit.

11. An image forming apparatus comprising:
a receiving unit that receives two pieces of image data to be compared with each other;
a detecting unit that detects a difference between the two pieces of image data received by the receiving unit;
a generating unit that, if portions in the image data where the difference is detected by the detecting unit are portions overlapped with each other and are portions for which it is estimated to be difficult to identify the content of modification in the display of the difference, generates difference image data indicating the difference between the two pieces of image data for comparison by adding an auxiliary image to highlight the content of the detected difference; and
an output unit that outputs an image on a basis of the difference image data generated by the generating unit.

12. A non-transitory computer readable medium storing a program causing a computer to execute a process comprising:
receiving two pieces of image data to be compared with each other;
detecting a difference between the received two pieces of image data; and
generating, if a drawing element in the image data where the difference is detected is dense with modified parts to such an extent that it is estimated to be difficult to identify the content of modification in the display of the difference, difference image data indicating the difference between the two pieces of image data for comparison by adding an auxiliary image to highlight the content of the detected difference.

13. A non-transitory computer readable medium storing a program causing a computer to execute a process comprising:
receiving two pieces of image data to be compared with each other;
detecting a difference between the received two pieces of image data; and
generating, if portions in the image data where the difference is detected are portions overlapped with each other and are portions for which it is estimated to be difficult to identify the content of modification in the display of the difference, difference image data indicating the difference between the two pieces of image data for comparison by adding an auxiliary image to highlight the content of the detected difference.

14. An image processing method comprising:
receiving two pieces of image data to be compared with each other;
detecting a difference between the received two pieces of image data; and
generating, if a drawing element in the image data where the difference is detected is dense with modified parts to such an extent that it is estimated to be difficult to identify the content of modification in the display of the difference, difference image data indicating the difference between the two pieces of image data for comparison by adding an auxiliary image to highlight the content of the detected difference.

15. An image processing method comprising:
receiving two pieces of image data to be compared with each other;
detecting a difference between the received two pieces of image data; and
generating, if portions in the image data where the difference is detected are portions overlapped with each other and are portions for which it is estimated to be difficult to identify the content of modification in the display of the difference, difference image data indicating the difference between the two pieces of image data for comparison by adding an auxiliary image to highlight the content of the detected difference.

* * * * *